United States Patent
Rottenkolber

(10) Patent No.: US 10,433,351 B2
(45) Date of Patent: Oct. 1, 2019

(54) MOTOR VEHICLE CONTROLLER, METHOD FOR MONITORING A MOBILE INTERNET CONNECTION, AND MOTOR VEHICLE

(71) Applicant: Audi AG, Ingolstadt (DE)

(72) Inventor: Tobias Rottenkolber, Kösching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/309,753

(22) PCT Filed: Mar. 29, 2017

(86) PCT No.: PCT/EP2017/057466
§ 371 (c)(1),
(2) Date: Dec. 13, 2018

(87) PCT Pub. No.: WO2017/215802
PCT Pub. Date: Dec. 21, 2017

(65) Prior Publication Data
US 2019/0124703 A1    Apr. 25, 2019

(30) Foreign Application Priority Data

Jun. 14, 2016 (DE) .......................... 10 2016 007 183

(51) Int. Cl.
*H04W 76/10* (2018.01)
*H04W 4/44* (2018.01)
(Continued)

(52) U.S. Cl.
CPC ............ *H04W 76/10* (2018.02); *H04W 4/046* (2013.01); *H04W 4/14* (2013.01); *H04W 4/44* (2018.02); *H04W 24/08* (2013.01)

(58) Field of Classification Search
CPC ......... H04W 76/10; H04W 4/14; H04W 4/44; H04W 4/046
See application file for complete search history.

(56) References Cited

U.S. PATENT DOCUMENTS 8,797,958 B2 * 8/2014 Waldner ................. G07C 5/008
370/328
9,036,509 B1    5/2015 Addepalli et al.
(Continued)

FOREIGN PATENT DOCUMENTS

CN    1013211322 A    12/2008
DE    102010009257 A1    8/2011
(Continued)

OTHER PUBLICATIONS

International Preliminary Report on Patentability directed to related International Patent Application No. PCT/EP2017/057466, dated May 23, 2018, with attached English-language translation; 12 pages.
(Continued)

*Primary Examiner* — Nam T Huynh
(74) *Attorney, Agent, or Firm* — Sterne, Kessler, Goldstein & Fox P.L.L.C.

(57) ABSTRACT

The disclosure relates to a method for monitoring an internet connection, which is provided in a motor vehicle by means of a mobile wireless connection established between the motor vehicle and a mobile wireless network, wherein the mobile wireless connection has switched into roaming operation is detected by way of a roaming signal. A predetermined connectivity test is performed by means of a control apparatus in the motor vehicle after receipt of the roaming signal in order to detect an interruption of the internet connection and, if an interrupted internet connection is detected, an indication signal is sent to a user of the motor vehicle.

8 Claims, 1 Drawing Sheet

(51) Int. Cl.
  *H04W 4/14*    (2009.01)
  *H04W 4/04*    (2009.01)
  H04W 24/08     (2009.01)

(56)               References Cited

U.S. PATENT DOCUMENTS 9,674,880 B1 *   6/2017  Egner .................. H04W 4/029
   9,894,601 B2 *   2/2018  Murray ................ H04W 48/16
2003/0069028 A1    4/2003  McCann
2004/0203728 A1   10/2004  Schwinke et al.
2010/0167737 A1    7/2010  Madhavan et al.
2010/0172312 A1    7/2010  Hayashi
2012/0196564 A1    8/2012  Yi et al.
2012/0196618 A1    8/2012  Lowell et al.
2013/0080618 A1    3/2013  Balwani
2015/0363210 A1   12/2015  Wehrman et al.

FOREIGN PATENT DOCUMENTS

DE      102012213619 A1    2/2014
DE      102015108793 A1   12/2015
EP           2814268 A1   12/2014

OTHER PUBLICATIONS

International Search Report and Written Opinion of the International Search Authority directed to related International Patent Application No. PCT/EP2017/057466, dated Jul. 4, 2017, with attached English-language translation; 21 pages.

* cited by examiner

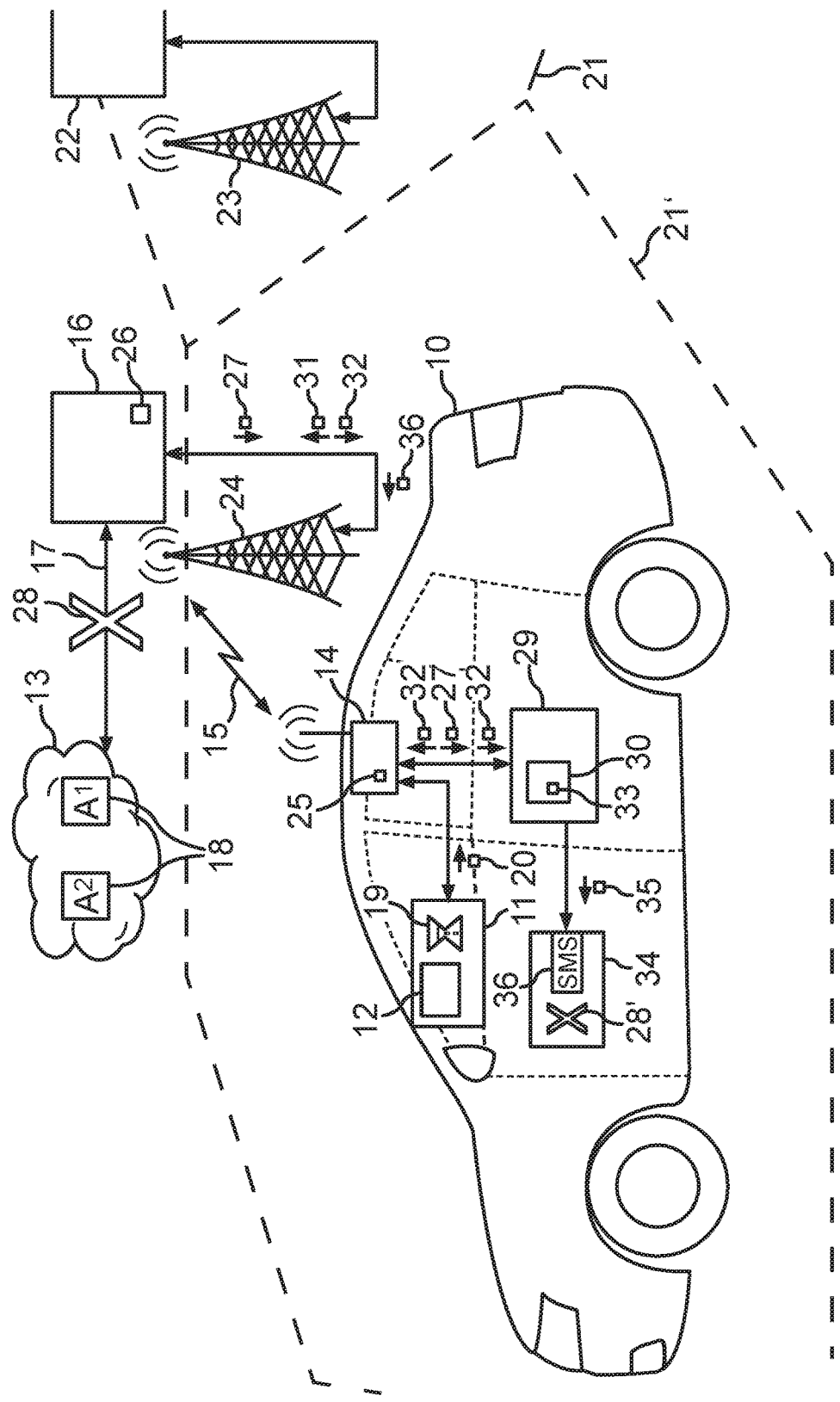

MOTOR VEHICLE CONTROLLER, METHOD FOR MONITORING A MOBILE INTERNET CONNECTION, AND MOTOR VEHICLE

TECHNICAL FIELD

The present application refers to a method for monitoring an internet connection which is provided in a motor vehicle by means of a mobile wireless connection established between the motor vehicle and a mobile wireless network. The present application also includes a control apparatus for carrying out the method. Finally, the present application further includes a motor vehicle comprising the control apparatus according to the disclosure.

BACKGROUND

A mobile wireless module can be provided in a motor vehicle and able to operate or make available an internet connection with a mobile wireless network based on a SIM card (SIM—Subscriber Identification Module). By means of a mobile wireless connection of this kind, what is known as a data connection can be accomplished, by way of which an internet connection between the motor vehicle and an internet server can be established.

As soon as an international border is crossed, most SIM cards connect to a foreign mobile wireless network and enter what is known as roaming mode. This may be indicated by an "R" on the display or monitor of a mobile portable terminal such as a smartphone. In addition, an SMS (Short Message Service) message is sent from the operator of the mobile wireless network to the mobile telephone number for the SIM card in order to inform the user of the SIM card that they are now using said mobile wireless network.

In order to avoid switching to roaming mode in a new mobile wireless network, which results in unwanted costs for data transfer via an internet connection, some mobile service providers allow the aforementioned data connection to be blocked, thus interrupting the internet connection, and only to be continued after the user has once again enabled internet access on a standard web page known as a landing page by, for example, having signed up for a paid service package. The internet connection functions in roaming mode only after payment of such a charge by way of an SMS message or selection via the landing page.

Regardless of user input, the internet connection in a motor vehicle may entirely be used by a device or multiple devices in the motor vehicle itself which do not have the inherent ability to display or use a web page. For example, this may be the case for an infotainment system used to display traffic or weather data available on the internet. If a user then travels with the motor vehicle to a foreign country, then the SIM card in the mobile wireless module of the motor vehicle registers on a different mobile wireless network and enters roaming mode as a result. The internet connection is thereby interrupted, and the in-vehicle services all cease to function. However, this is not immediately apparent to the user. In particular, it is not apparent to the user that the respective service is no longer displaying or providing any current data.

A method is known from DE 10 2012 213 619 A1 in which a switch to roaming mode in a mobile wireless network is automatically recognized.

It known from DE 10 2010 009 257 A1 that a mobile wireless module can be provided with multiple profiles for the use of mobile wireless networks, with a suitable profile able to be selected upon switching to a new mobile wireless network in order to avoid roaming fees.

It is known from DE 10 2015 108 793 A1 that roaming fees for a terminal are able to be avoided by changing to a different network type, for example a WiFi connection, when switching to roaming mode.

Connectivity tests for verifying a communications connection are known from US 2004/0203728 A1, US 2013/0080618 A1, and US 2012/0196618 A1. Known from U.S. Pat. No. 9,036,509 B1 is a method of forwarding data packets in which it is verified whether a routing path leads to a "dead end." Known from US 2012/0196564 A1 is the ability to determine whether a mobile terminal is executing a roaming mode. Known from US 2003/0069028 A1 is a mobile terminal that alternately tests a variety of mobile telephone numbers in order to reach an internet server.

BRIEF DESCRIPTION OF DRAWINGS/FIGURES

FIG. 1 shows a schematic diagram of a motor vehicle, in accordance with some embodiments.

DETAILED DESCRIPTION

The object of some embodiments of the present application is to provide an indication of a potential disruption of an internet connection in a motor vehicle due to an interruption of the data connection while roaming.

This object is to be achieved by the subject-matter of the independent claims. Preferential refinements of the embodiments are described by way of the dependent claims, the description hereinafter, as well as the drawing.

In accordance with some embodiments, a method is provided for monitoring an internet connection which is provided in a motor vehicle by way of a mobile wireless connection which is in turn established between the motor vehicle and a mobile wireless network. The fact that the mobile wireless connection has switched into roaming mode or roaming operation is recognized by way of a roaming signal.

In order to prevent the user from then continuing to rely upon data which are displayed by at least one device in the motor vehicle and intended to be updated on the basis of data obtained via the internet connection, it is provided that a predetermined connectivity test be performed by a control apparatus in the motor vehicle after the roaming signal is received in order to detect an interruption of the internet connection. An indication signal is sent to the user of the motor vehicle when an interruption in the internet connection is detected. For example, the error message may indicate that the internet connection has failed. In case the connectivity test shows that the internet connection continues to exist, preferably no action or indicator signal related to a failed internet connection will be sent.

The advantage is that, when a roaming signal is received, the control apparatus automatically verifies whether the internet connection continues to exist or has been interrupted due to switching to the mobile wireless network. The interruption can, for example, be caused by the mobile wireless network operator initially directing all requests for an internet connection to the aforementioned landing page, thus making all other internet servers unreachable.

In accordance with some embodiments, the internet connection described herein should not be understood as a complete peer-to-peer connection, but rather access to the internet by the mobile wireless network in a way able to be provided by way of a GGSN (Gateway GPRS Support Node, GPRS—General Packet Radio Service) originating from the mobile wireless network.

The preferential refinements in accordance with some embodiments are disclosed, the features of which result in further advantages.

In accordance with some embodiments, the aforementioned connectivity test comprises the transmission of a predetermined query message to at least one predetermined internet address for verification of whether a predetermined response message expected during an existing internet connection is received within a predetermined time period. If this is not the case, then an interrupted internet connection is correspondingly detected. Said at least one internet address can, for example, be stored in the control apparatus.

In accordance with some embodiments, the query message can, for example, be transmitted in the form of a so-called ping message according to the Internet Control Message Protocol (ICMP). In some embodiments, a query command is transmitted in a way to be generated by a web browser used to retrieve a web page. In other words, the control apparatus behaves like an internet browser during the connectivity test. The advantage brought about thereby is that an existing internet connection of the kind necessary for operating a web browser will nevertheless be detected even in case, for example, a ping message is blocked by the mobile wireless network.

In accordance with some embodiments, the query message is in the form of a command transmitted according to HyperText Transfer Protocol (HTTP) or Secure HyperText Transfer Protocol (HTTPS). In other words, the connectivity test takes place in the form of at least one HTTP retrieval or one HTTPS retrieval. It is thereby verified whether the internet connection at least exists for HTTP or HTTPS, as a result of which the most important connection type used for internet connections is tested.

In accordance with some embodiments, the connectivity test comprises the transmission of a respective query message to at least two different internet addresses. Advantageously, this does not lead to a false alarm or the erroneous detection of an interrupted internet connection in the absence of the response message from one of the internet addresses due to, for example, the server for this internet address having failed or for reason of another error. But this does not yet mean that the internet connection between the motor vehicle and the internet has been entirely interrupted.

In some embodiments, the connectivity test is only performed in case a web browser and/or a navigation means and/or an infotainment system in the motor vehicle has also actually generated a timeout signal while using the internet connection. Advantageously, the connectivity test is thereby performed only if necessary. As a result, the user receives the indication signal only in the event that the internet connection was actually being used and/or is necessary.

As previously explained, the indication signal can include user output informing the user of the failed internet connection. It is preferably provided that detection of the interrupted internet connection activates a retrieving means used for receiving and/or displaying a message expected from the mobile wireless network in the presence of roaming operation. A retrieving means of this kind can, for example, be a part of the infotainment system and provided for reading messages coming from the mobile wireless network. For example, said means may be a program module. As a result, the user is able to confirm whether a message which might be related to roaming mode has been sent to them by the mobile wireless network. In accordance with some embodiments, this may be a form of indication signal.

In accordance with some embodiments, a retrieving means, hence a reader means used to read Short Message Service (SMS) messages, is activated for an SMS message. The retrieving means then displays the message via a display means in the motor vehicle. The display means may also be referred as a reader means in this disclosure. For example, the display means can be a screen, e.g. in a center console or an instrument cluster of the motor vehicle. As explained in the introductory section, an SMS message of this kind is legally required during roaming operation when switching to a mobile wireless network and should therefore be expected when switching to said mobile wireless network.

In accordance with some embodiments, a control apparatus for a motor vehicle is disclosed. The control apparatus can, for example, be in the form of a motor vehicle control unit. The control apparatus comprises a processing means which is configured to implement an embodiment of the method according to the invention. For this purpose, the processing means can comprise at least one microprocessor and/or at least one microcontroller. In addition, the processing means can feature a program code configured for the purpose of implementing the embodiment of the method according to the invention when executed by the processing means. The program code is able to be stored in a data memory of the processing means.

In accordance with some embodiments, a motor vehicle comprising a mobile wireless module and a design of the control apparatus is disclosed. The mobile wireless module can, for example, be an LTE wireless module, a 5G wireless module, or an UMTS wireless module. The wireless module can feature a SIM card slot in the manner described or be connected to one. A user's SIM card can then be inserted therein in order to establish a mobile wireless connection by way of the mobile wireless module.

The motor vehicle in accordance with some embodiments may be an automobile, in particular a passenger car or a truck.

FIG. 1 shows a schematic diagram of a motor vehicle, in accordance with some embodiments.

The components of the embodiment described represent features disclosed herein, each of which is to be regarded as individual and independent from the other, or may be combined in a combination other than that shown herein. Moreover, a person having ordinary skill in the art may augment the embodiment described herein by further of the previously described features.

The FIG. 1 shows a motor vehicle 10 which can, for example, relate to an automobile, in particular a passenger car. Provided in the motor vehicle 10 is a device 11 which uses online data 12, meaning data which must be received from the internet 13.

The motor vehicle 10 can for this purpose feature a mobile wireless module 14 which may, for example, be a UMTS module, an LTE module, or a 5G module. By means of the mobile wireless module 14, a mobile wireless connection 15 originating from the motor vehicle 10 can be established with a mobile wireless network 16. Via the mobile wireless connection 15, an internet connection 17 originating from the mobile wireless network 16 can be provided or established. Herein, the term "internet connection" means that it is possible to access or contact a server 18 on the internet from the motor vehicle 10 or to communicate with said server by entering an internet address. A server 18 on the internet may be a computer or a so-called host. While the device 11 is waiting for new online data 12 to come from the internet 13, a time measuring unit 19 can measure the delay for new online data or for a confirmation response indicating success in establishing a communication connection with a server 18. The time measuring unit 19 may, for example, be a program module of the device 17. If no new online data arrive or the connection fails to be established, then the device 11 can generate a timeout signal 20.

The internet connection 17 can be interrupted through the following process.

During a journey, the motor vehicle 10 can exit a reception area 21 of a mobile wireless network 22 and enter a reception area 21' of the mobile wireless network 22, as a result of which a base station 23 of the mobile wireless network 16 interrupts the wireless connection with the mobile wireless module 14, and a base station 24 of the new mobile wireless network 16 establishes the mobile wireless connection 15 with the mobile wireless module 14. The mobile wireless network 16 can relate to a foreign mobile wireless network, meaning that a SIM card 25 in the mobile wireless module 14 is registered for the mobile wireless networks 22 of a different country. As a result, the mobile wireless connection 15 will be operated in roaming mode 26. This can be signaled to the mobile wireless module 14 by way of a roaming signal 27 able to be provided by the mobile wireless module 14 in the motor vehicle 10. Upon entry of the motor vehicle 10, the mobile wireless network 16 is able to initiate an interruption 28 of the internet connection 17 and the establishment of the mobile wireless connection 15 with the mobile wireless network 16. The device 11 is then unable to independently receive new online data 12 from the internet 13. In other words, the time measuring means 19 expires and issues a timeout. The timeout signal 20 is generated as a result.

Depending on the roaming signal 27, a control apparatus 29 in the motor vehicle 10 can verify whether the interruption 28 is being initiated or activated by the mobile wireless network 16. For this purpose, the control apparatus 29 can perform a connectivity test 30 which, by means of the control apparatus 29, is able to provide at least one query message 31 transmitted to a respective predetermined internet address A1, A2 for a respective server 18 on the internet 13. If the interruption 28 is not active, then the respective query message 31 will reach the server 18 with the respective internet address A1, A2. The server 18 can then respond then with a response message 32.

However, if there is no response message 32 from any internet address A1, A2 for a predetermined time period 33, then the connectivity test 30 fails, meaning that the interruption 28 of the internet connection 17 will be diagnosed, determined, or detected. An indication signal 35 can then be sent to the display means 34 by way of the control apparatus 29. As a result, it can be displayed to the user by way of, for example, an interruption indication 28' that an interruption 28 of the internet connection 17 has taken place.

In addition, or as an alternative thereto, the indication signal can, for example, be in the form of a reader program used for SMS messages 36. The interruption 38 must be communicated to the user of the mobile wireless module 14 by way of the mobile wireless network 16, specifically in the form of an SMS message 36. As a result, the SMS message is automatically displayed on the display unit 34. The user can then resolve or remedy the interruption 28 of the internet connection 17 in accordance with instructions which may be contained in the SMS message 36.

The connectivity test 30 can also be performed depending on whether the timeout signal 20 was generated by at least one device 11 in the motor vehicle 10.

As a result, the fact that a data connection no longer exists can be displayed to the user, who is then able to understand why the device 11 is no longer displaying current online data 12. Since there are worldwide regulations requiring all mobile wireless providers to send an SMS message informing customers of roaming operation 26, this SMS message can likewise be displayed when an interruption 28 of the internet connection 17 takes place. The user can then activate data usage for the mobile wireless network 16.

As a result, the user is automatically informed that no internet connection currently exists since the interruption 28 for roaming operation 26 is activated in a standardized manner, so services being provided by the device 11 are halted. The user is then aware that there is no fault in the motor vehicle and that they are being requested to make an active decision to be charged a roaming fee for data connections.

The connectivity test 30 actively tests the internet connection 17 by transmitting a query message 31 in the form of, for example, a ping message and/or an http/https retrieval to at least one predetermined internet address A1, A2. In order to rule out a fault or failure of the server 18, preferably at least two query messages 31 are transmitted or delivered to different servers 18. If the connectivity test from either of the two is successful, then no further action is necessary since there is an existing internet connection 17. However, if there are no response messages 36 to any of the query messages 31 even though there is an existing mobile wireless connection 15 with the mobile wireless network 16, then the block or interruption 28 of data usage is active. The user is then informed in the manner described that there is no longer an internet connection 17 and it is therefore possible that devices such as the device 11, which need to receive online data 12 from the internet, may no longer function as intended.

When the SMS message 36, which is mandatory in order to indicate roaming operation 26, arrives, then this SMS message 36 can be displayed to the driver on the display means 34. For example, in case multiple SMS messages are present, it can be provided that only the most current SMS is displayed The user can then communicate their decision to the mobile wireless network 16 by responding to the SMS message, thus bringing about activation of the internet connection 17.

On the whole, the example demonstrates how a display of the lack of an internet connection while roaming is able to be generated by means of the invention.

The invention claimed is:

1. A method for monitoring an internet connection in a motor vehicle, comprising:
   receiving a roaming signal to indicate a mobile wireless connection in a roaming mode;
   detecting a change of the mobile wireless connection to the roaming mode;
   in response to the detected change, performing a predetermined connectivity test to detect an interruption of the internet connection; and
   in response to the detected interruption of the internet connection, activating a display to present an indication signal,
   wherein the indication signal is a received short message service (SMS) message,
   wherein the internet connection uses the mobile wireless connection, and wherein the mobile wireless connection is established between a mobile wireless module in the motor vehicle and a mobile wireless network.

2. The method of claim 1, further comprising verifying reception of a predetermined response message over the internet connection within a predetermined time period,
wherein the connectivity test comprises transmission of a predetermined query message to at least one predetermined internet address.

3. The method of claim 2, further comprising retrieving an internet page to verify the internet connection via transmission of the query message,
wherein the query message is transmitted in a form of at least one of a ping message and a query command, and
wherein the ping message or the query command is generated by an internet browser.

4. The method of claim 3, wherein the query message is transmitted in the form of a command according to a HyperText Transfer Protocol (HTTP) or a Secure HyperText Transfer Protocol (HTTPS).

5. The method of claim 1, wherein the connectivity test comprises transmission of a query message to at least two different internet addresses.

6. The method of claim 1, further comprising only in response to a timeout signal generated by at least one of a web browser, a navigation system, and an infotainment system while using the internet connection, performing the connectivity test.

7. A control apparatus for a motor vehicle configured to:
receive a roaming signal to indicate a mobile wireless connection in a roaming mode;
detect a change of the mobile wireless connection to the roaming mode;
in response to the detected change, perform a predetermined connectivity test to detect an interruption of an internet connection in the motor vehicle; and
in response to the detected interruption of the internet connection, activate a display to present an indication signal,
wherein the indication signal is a received short message service (SMS) message,
wherein the internet connection uses the mobile wireless connection, and
wherein the mobile wireless connection is established between a mobile wireless module in the motor vehicle and a mobile wireless network.

8. A motor vehicle, comprising:
a mobile wireless module for establishing a mobile wireless connection; and
a control apparatus configured to:
receive a roaming signal to indicate the mobile wireless connection in a roaming mode;
detect a change of the mobile wireless connection to the roaming mode;
in response to the detected change, perform a predetermined connectivity test to detect an interruption of an internet connection in the motor vehicle; and
in response to the detected interruption of the internet connection, activate a display to present an indication signal,
wherein the indication signal is a received short message service (SMS) message,
wherein the internet connection uses the mobile wireless connection, and
wherein the mobile wireless connection is established between a mobile wireless module in the motor vehicle and a mobile wireless network.

* * * * *